May 29, 1934.   L. W. BLAU   1,960,891
MEASURING INSTRUMENT
Filed Nov. 15, 1929
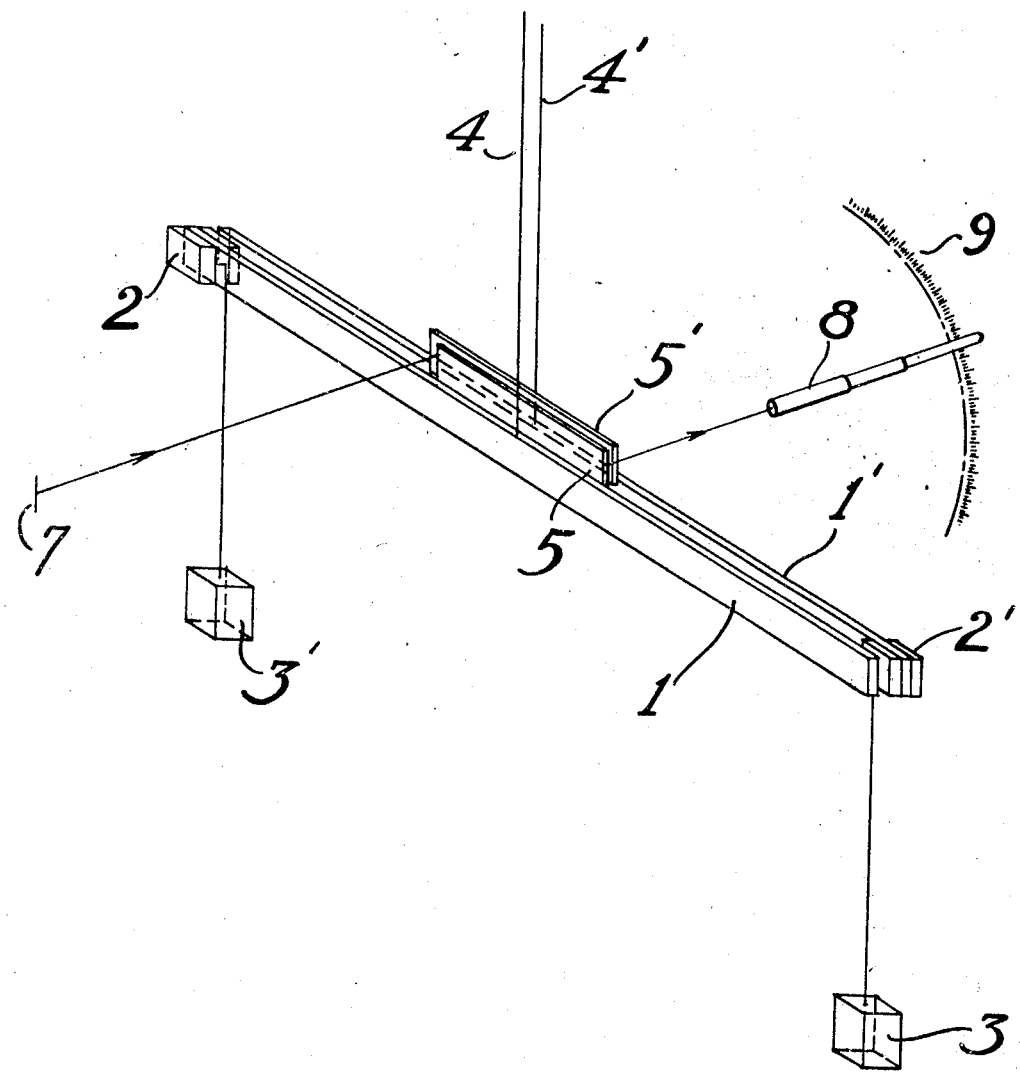
L. W. Blau Inventor
W. E. Currie Attorney Patented May 29, 1934

1,960,891

UNITED STATES PATENT OFFICE 1,960,891

MEASURING INSTRUMENT

Ludwig W. Blau, Houston, Tex., assignor, by mesne assignments, to Standard Oil Development Company, a corporation of Delaware Application November 15, 1929, Serial No. 407,495

1 Claim. (Cl. 265—1)

This invention relates to measuring instruments and has for its object to provide a construction simple in operation and more accurate in results than those heretofore proposed.

With these and other objects in view the invention resides in the novel details of construction and combinations of parts more fully hereinafter disclosed and particularly pointed out in the claim.

This invention is well adapted for use in many scientific instruments involving an oscillating system and particularly those employing a torsion balance. In the last mentioned type of instruments the angle through which the beam is deflected due to gravitational attraction is proportional to the square of the period of the balance. In order to obtain readable deflections it has been necessary heretofore, to employ instruments having periods of about twenty minutes as a result of which the time required for one observation is about forty minutes. Now it is known to those familiar with the art that extraordinary measures are necessary to secure reliable data on account of the effects of temperature changes and other disturbing causes which often become of considerable magnitude in the course of forty minutes. Furthermore, since at least three, and preferably four or five, readings must be obtained at each station the time required to obtain the necessary data at any one station is at least two, and in practice four, hours. The torsion balances embodying the improvements herein described will yield all the necessary data at any one station in not over fifteen minutes.

It follows, then, that an instrument which yields data in a small fraction of the time heretofore necessary would also be less liable to the disturbing causes and would therefore permit of the attaining of considerably increased accuracy.

Since any reduction of the period of the balance results in a decrease of the angular deflection of the instrument, it is necessary to magnify the deflection to such an extent as will cause it to be readable. By this invention there are employed two mirrors to secure the requisite magnification by the multiple reflection of a beam of light during its passage between the mirrors.

The nature of the invention will be more readily understood if reference is made to the accompanying drawing which diagrammatically shows the oscillating system of a torsion balance having attached to the beam a mirror of such dimensions as may be calculated to be necessary to obtain the desired results. That is to say the beam 1 has the mass 2 fixed at one end thereof, while the mass 3 is suspended from the other end by means of a wire. The beam is hung from a point on the frame of the instrument not shown by means of a torsion wire 4, and a mirror 5 is secured either to the wire 4 or to a thin rod screwed into the beam at its midpoint and to which the wire 4 is fastened. It is obvious, then, that any rotation of the balance beam will cause a like rotation of the mirror 5 about a vertical axis. Another mirror 5' is secured to the beam of a second oscillating system similar to the one described but turned through an angle of 180°, so that the upper weight of one system will be on the same side of the instrument as the lower weight of the other system. The second oscillating system comprises a balance beam 1', an upper weight 2', a lower weight 3', a torsion wire 4' and a mirror 5' secured to the wire 4'. In such a double balance the rotations of the two systems due to gravitational attractions are then approximately equal and in opposite directions, thus giving about twice the deflection of the image obtained if there were only one moving system and the mirror 5' were fastened to the frame.

The distance between the mirrors is adjusted to any desirable values by any one of a number of such devices as immediately suggest themselves to those familiar with the art. The planes of the reflecting surfaces may be parallel, but such parallelism is not essential. Light from the source, which may be a slit 7, is reflected from the mirror 5' to the mirror 5 and then suffers a number of additional reflections depending on the distance between the reflecting surfaces and on the angle of incidence. After its last reflection from the mirror 5 the light enters a telescope 8 having a scale 9 mounted in the plane in which the real image of the source 7 is formed by the objective of the telescope. If now the mirrors 5 and 5' are rotated through any given angle the image is rotated through twice this angle multiplied by the number of reflections which the ray of light has suffered during its passage between the mirrors.

It is possible to arrange the distance between the mirrors and the angle of incidence so as to cause the light to be reflected fifty times or more. Then the angular accuracy of reading would be increased fifty times or more over that attainable with the torsion balances now in use. Calculation shows that if front silvered mirrors are employed the intensity of the red component of the light used will be reduced to one per cent of the incident intensity after about sixty reflections. With an angular accuracy of reading fifty times that obtainable with the conventional balances whose period is about twenty minutes it will be possible to reduce the period to about one seventh, or to about three minutes. This reduction in the time required to obtain a reading is important, not only on account of the time saved but also for the fact that the effects of variations in temperature and other causes, which adversely affect the reliability of the data, are likewise reduced.

Another method of achieving the same results yielded by the arrangement described above is to have the light coming from the source 7 focused on a scale by means of a lens placed at the proper point in the path of the light. The scale may then be viewed with an eyepiece.

From the foregoing it will therefore be evident that by this invention there is provided a means of multiplying the visibility of oscillation of the beam of a torsion balance by utilization of a ray of light reflected many times between two mirrors, each of said mirrors carried by a separate movable beam. That is to say, even the slightest movement of oscillation of the beams 1 and 1' will cause a change of angle between the two mirrors 5 and 5' with the result that the incident ray from the source 7 will have the angles of its reflections changed to the end that the last reflection of said ray will assume a different position from that which it occupied before the movement of the balance beam. The telescope can then be moved over the scale 9 and readings obtained at the limitations of the position of the reflected ray. It is to be understood, of course that the image of the source of light and the scale 9 are viewed simultaneously without parallax by means of the eyepiece of the telescope since the scale 9 is in the plane of said image.

It is obvious that those skilled in the art may vary the details of construction as well as arrangement of parts without departing from the spirit of the invention, and therefore it is not desired to be limited to the foregoing except as may be required by the claim.

What is claimed is:—

A measuring instrument comprising two torsion balances with their beams turned at an angle of 180° with respect to each other, and a system of light reflection comprising two mirrors, one attached to the one balance beam and the other attached to the other balance beam in such manner that a ray of light undergoes successive reflections in passing between the two mirrors suffering multiple reflection on each mirror, whereby the movements of said beams may be observed in greatly multiplied degree.

LUDWIG W. BLAU.